Patented Jan. 19, 1943

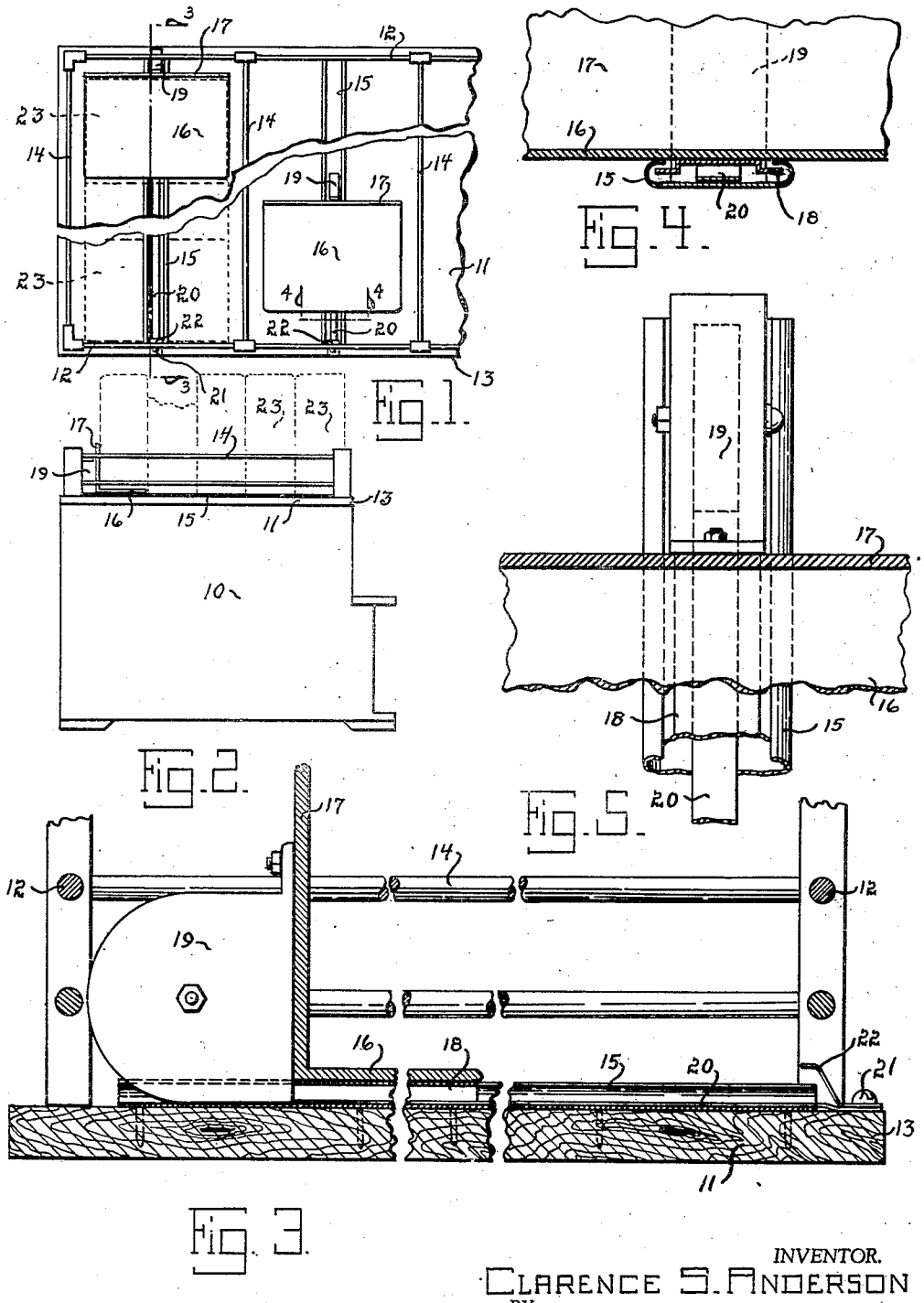

2,308,851

UNITED STATES PATENT OFFICE 2,308,851

CARRIER MEMBER FOR DISPLAY RACKS

Clarence S. Anderson, Des Moines, Iowa, assignor to New Monarch Machine & Stamping Co., Des Moines, Iowa Application December 12, 1940, Serial No. 369,731

2 Claims. (Cl. 211—49)

The principal object of my invention is to provide a carrier for display racks which will keep the merchandise placed on the rack in position at the fore part of the rack.

More specifically, the object of my invention is to provide a means for forcing baked goods such as loaves of bread to the front edge of the display rack as the front loaves of bread or the like are removed from the rack.

A further object of this invention is to provide a carrier member for display racks which is spring actuated, which contributes to the uniformity of the display upon the rack, thereby providing a display rack that is pleasing to the eye when merchandise is displayed upon it and which will automatically maintain its regularity when pieces of merchandise are removed therefrom.

A still further object of my invention is to provide a carrier for display racks or the like that is extremely economical in manufacture, durable and efficient in use.

These and other objects will be apparent to those skilled in the art.

My invention consists in the construction and arrangement and combination of the various parts of the device, whereby the objects contemplated are attained as hereinafter more fully set forth, pointed out in my claims and illustrated in the accompanying drawing, in which:

Fig. 1 is a top elevational view of a portion of a display rack with my carrier mechanism mounted thereon.

Fig. 2 is an end elevational view of a display rack with my mechanism installed thereon and ready for use.

Fig. 3 is an enlarged cross sectional view of a portion of a display rack with my carrier mounted thereon and more fully illustrates its structure and is taken on line 3—3 of Fig. 1.

Fig. 4 is an enlarged front end view of the carrier member and track and is taken on the approximate line 4—4 of Fig. 1.

Fig. 5 is an enlarged top cross sectional view of a portion of the carrier track and spring tension means.

It has always been objectionable in the retail bakery trade to use an ordinary display rack for the display of bread or other merchandise. This is due principally to the fact that the purchaser removes the item at the front of the rack, thereby leaving a gap and more or less hiding successive rows of the merchandise. It was necessary for the employees to move the merchandise instead every time a piece of the merchandise was removed, thus entailing a considerable amount of time and labor.

This disadvantage of such display racks is particularly noted in the bakery goods business. For instance, a large number of loaves of bread are sold to the purchasing public every day, and it is noticed that the sales volume of the bread from which the front tier has been removed is considerably below the sales volume of the bread that is always at the forward part of the display rack. For this reason, bakeries have for a long time employed persons whose specific job it is to keep the bread pushed to the forward edge of the display rack at all times in order to maintain a certain sales volume on the bread. This same thing is true of all bakery goods, and even other types of merchandise, but is particularly noticeable to the bakeries where bread is concerned. I have overcome such disadvantages by providing a carrier mechanism which automatically and without attention, performs the duties heretofore necessarily performed by hand.

Referring to the drawing, I have used the numeral 10 to designate a display rack having a top shelf 11 and a retaining rail 12 about its upper marginal edge. I have designated the forward edge of this display top shelf 11 by the numeral 13. It is to such a rack and to such a self that I attach my device, which I will now describe.

The numeral 14 indicates railings running rearwardly from the forward part of the shelf 13 and parallel to each other. For purposes of illustration, I will describe my invention for use with bread. The railings 14 are spaced apart a suitable distance for loosely accommodating a loaf of bread on end. In each of these sections formed by the parallel rails or bars 14 I place one of my carrier units, consisting of a hollow flange track element 15 securely fastened by nails or the like to the display rack shelf 11 and parallel with the railing portions 14. The numeral 16 indicates the base of a carrier member having an upwardly extending rearward wall 17 as shown in the drawing. The numeral 18 indicates a bracket flange secured to the lower surface of the plate or carrier 16 for running within the track guide member 15. The numeral 19 indicates an ordinary clock-wound, spring-tension mechanism of the type commonly used in double-hung windows, which has in operative communication therewith, the flexible steel tape member 20. As is well known, a spring is placed within the housing 19 about a tube and within a cylinder and the steel tape 20 is wound on the outside of the cylinder. Thus when the tape is unreeled, a tension is applied to the spring. The housing 19 is placed on the back plate 17 of the carrier 16 so that the lower marginal edge of the housing 19 extends below the plate 16 and within the central portion of the track member 15. The tape 20 runs through the longitudinal center of the track 15 and is secured by a bolt 21 at a point adjacent the forward edge 13 of the top shelf 11. I have used the numeral 22 to indicate a stopping member, which will engage the forward edge of the plate 16 when the shelf becomes empty. I have used the numeral 23 to indicate loaves of bread or other merchandise placed between the guide rails 14 and on the top shelf 11 and carrier 16.

The practical operation of my device is as follows:

The carrier 16 is moved to its rearward position, thus unreeling the tape 20 from within the housing 19 and placing a tension upon the carrier 16. Loaves of bread or other merchandise are then placed between the guide rails 14 and under tension between the back plate 17 and the forward rail 12 of the display rack. Each section is so built up and when the forward loaf of bread or other mechandise is removed, the tension upon the spring within the housing 19 will cause the carrier to move forwardly, thus bringing the next succeeding loaf of bread or other mechandise to a point of contact against the front rail 12 of the display rack and as each succeeding loaf of bread is removed, the same action will result, thereby assuring the alignment of the merchandise at the front of the rack at all times.

Thus it will be seen that I have provided a carrier for display racks or the like which fulfills all of my objects, which will automatically place the merchandise at the forward portion of the rack without attention of any kind, that is durable in its structure, flexible and versatile in its adaptation to display shelves or racks.

Although I have described my device for use with bakery goods and upon a display rack, it may be placed upon any type of shelving or counters and any type of yielding means may be substituted for the member 19 and tape 20, as any type of yielding means for forcing the carrier member forwardly may be employed. Any number of tracks may be used and the device may be used either longitudinally or horizontally relative to the supporting structure to which it is attached.

Some changes may be made in the construction and arrangement of my improved carrier member for display racks without departing from the real spirit and purpose of my invention, and it is my intention to cover by my claims any modified forms of structure or use of mechanical equivalents which may be reasonably included within their scope.

I claim:

1. In a device of the class described, a shelf member, a hollow flange track element secured to said shelf member, a carrier member, a base on said carrier member, a bracket flange secured to the lower surface of said base and slidably engaging said hollow flange track element, a spring tension mechanism secured to the rearward side of said carrier member, and a steel tape having one end operatively engaged and held under tension by said spring tension mechanism and having its other end extending through said hollow flange track element and secured to the forward edge of said shelf.

2. In a device of the class described, a shelf member, a hollow flange track element secured to said shelf member, a carrier member, a base on said carrier member, a bracket flange secured to the lower surface of said base and slidably engaging said hollow flange track element, a spring tension mechanism secured to the rearward side of said carrier member, a steel tape having one end operatively engaged and held under tension by said spring tension mechanism and having its other end extending through said hollow flange track element and secured to the forward edge of said shelf, and a stop element secured adjacent the forward edge of said hollow flange track element for stopping said carrier and for holding the forward edge of said flexible tape member.

CLARENCE S. ANDERSON.